Patented Aug. 10, 1937

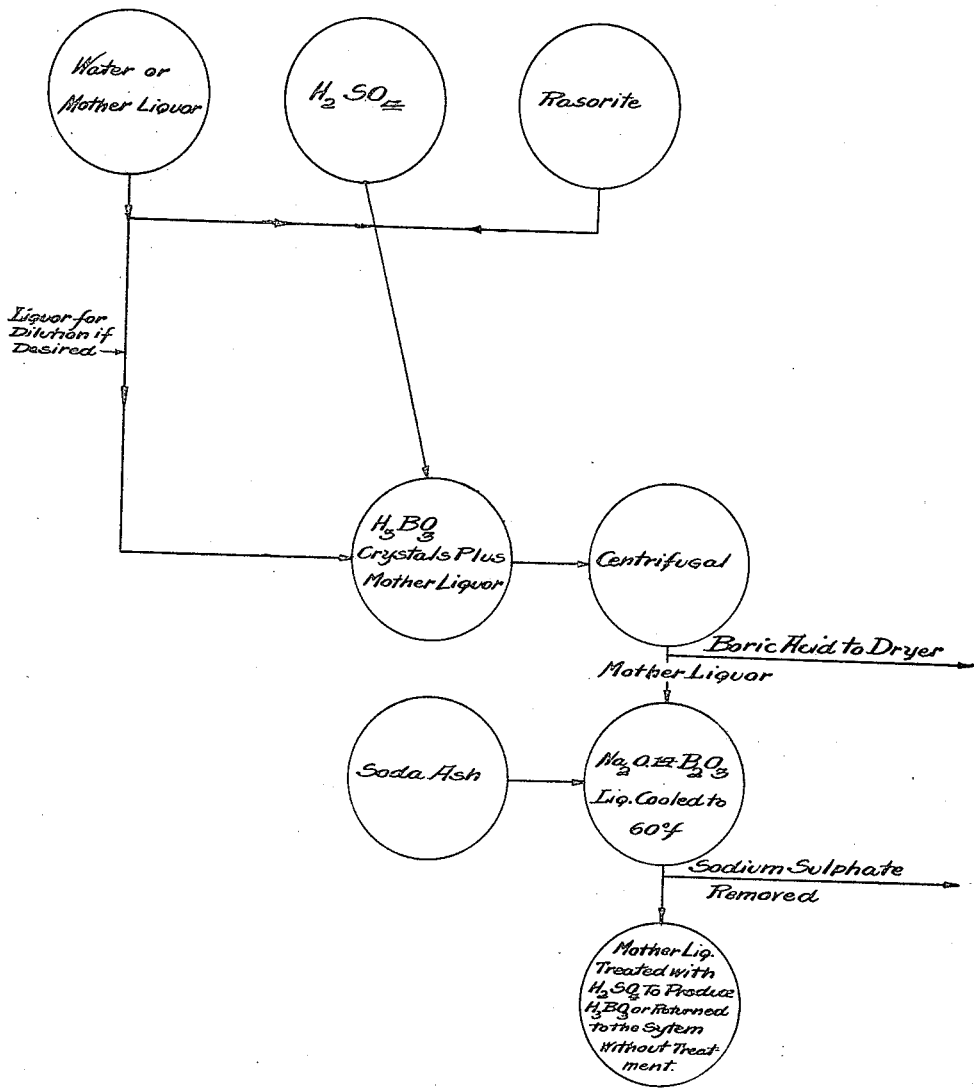

2,089,557

UNITED STATES PATENT OFFICE 2,089,557

PROCESS FOR RECOVERING SODIUM SULPHATE AND INCREASING THE YIELD OF BORIC ACID

Karl J. Jacobi, Roselle, N. J., assignor to Pacific Coast Borax Company, New York, N. Y., a corporation of Nevada Application February 19, 1929, Serial No. 341,270

3 Claims. (Cl. 23—149)

This invention relates to the production of sodium sulphate and its recovery from solutions containing same and is more particularly concerned with the recovery of sodium sulphate from mother liquors derived in processes of manufacturing boric acid.

In the manufacture of boric acid, solutions containing borates and more specifically sodium borates are usually treated with sulphuric acid to form boric acid and sodium sulphate. The conditions of operation are such that the solutions are generally saturated at ordinary temperatures with respect to boric acid, and nearly saturated with respect to sodium sulphate and usually result from the production of boric acid from such sodium borates either manufactured as borax or natural as rasorite by the addition of the required amounts of sulphuric acid. The ordinary temperatures referred to above include approximately the range between 75° F. and 90° F. although these temperatures will vary under the particular conditions employed in a given process, that is they may be higher or lower as, for example, when it is desired to increase or decrease production or quality of the product sought. The recovery of the ingredients of such solution depends on the physical characteristics of such solutions, and these may be briefly considered at this point. At 91° F. the solubility of sodium sulphate is about 33.5% of the anhydrous salt ($Na_2SO_4$) and from this point it decreases to about 4.75% at 32° F. This solubility of sodium sulphate is but slightly affected by the presence of boric acid. Consequently, by cooling the solution a considerable yield of Glauber salt may be obtained. However, cooling has the same effect on the boric acid in solution and, therefore, boric acid will crystallize in substantial quantity to contaminate the Glauber salt, if such crystallization is attempted on these solutions.

Another consideration required in processes of recovering boric acid is the fact that the mother liquors contain a substantial quantity of boric acid and unless the Glauber salt can be crystallized from the mother liquor in quite large amounts, such mother liquors cannot again be used in the cycle. If these mother liquors, carrying a substantial quantity of boric acid, cannot be re-used in the process, a heavy loss of boric acid is thus entailed, amounting in some cases to not much less than 25%. On the other hand, the removal of the Glauber salt enables a recovery of not less than 90% of boric acid to be made and the liquors may be re-used in the cycle indefinitely.

Further certain natural sodium borates such as rasorite ($Na_2B_4O_7 4H_2O$) contain iron and alumina in forms at least partly soluble in sulphuric acid and if such solutions are treated to recover sodium sulphate from them, the iron and aluminum will contaminate the Glauber salt obtained.

Among the objects of the present invention is a process of recovering Glauber salt of marketable purity from the mother liquors referred to above and solutions similar in character. Another object of the invention is to increase the yield of boric acid materially in processes where such mother liquors are obtained. A still further object of the invention is the production of sodium sulphate from such solutions substantially free from contaminating amounts of iron and aluminum.

Still other and further objects of the present invention will become apparent from the more detailed description set forth below, it being understood, however, that this more detailed description is set forth by way of illustration and not by way of limitation, since various changes may be made therein by those skilled in the art without departing from the scope and spirit of this disclosure.

The present invention makes use of the fact that certain borates, for example, those having a molecular ratio of $B_2O_3$ to $Na_2O$ higher than 2:1, have a higher solubility than boric acid. Consequently, in solutions containing sodium sulphate and boric acid, particularly after the maximum quantity of boric acid has been obtained from such solutions while avoiding crystallization of sodium sulphate, treatment of the solution to convert the $B_2O_3$ into a borate of higher solubility may be utilized in order to keep the $B_2O_3$ substantially in solution while sodium sulphate is being obtained as by crystallization.

An operation in accordance with the invention is diagrammatically illustrated in the accompanying drawing.

This is illustrated by treatment of a solution such as the mother liquor remaining after crystallization of boric acid, such solution containing residual boric acid which cannot be obtained from that solution without at the same time crystallizing substantial quantities of sodium sulphate. After boric acid has been crystallized out of the mother liquor at such temperatures as those within the above mentioned range, but still high enough not to permit any substantial amount of sodium sulphate to crystallize out, a quantity of an alkali metal compound such as sodium carbonate, preferably anhydrous, is added to produce the desired ratio of $B_2O_3:Na_2O$ in the solution. Following this, the solution may then be cooled down to a desired temperature to crystallize sodium sulphate preferably as the deka-hydrate. For example, sodium carbonate may be added to the solution to effect the ratio of $B_2O_3:Na_2O$ between 12:1 and 16:1. The solution may then be cooled down say to 60° F. with safety and occasionally lower to crystallize the sodium sulphate without any substantial crystallization of boric acid.

The solution treated with sodium carbonate as set forth above contains large amounts of $CO_2$ in the free state, and this gas of an acid nature prevents the iron and aluminum from precipitating and consequently contaminating the Glauber salt. This effect of the $CO_2$ is readily demonstrated by placing the solution under a vacuum. When this is done large volumes of the gas are given off and the iron and aluminum salts begin to precipitate almost immediately, probably as hydroxides.

As the Glauber salts contain almost 56% of water of crystallization and the salt is produced in considerable quantities, the liquors are constantly being reduced in amount and water may be added to replenish that withdrawn as water of crystallization. Such added water may be profitably derived from washing the products of crystallization, either the boric acid or the Glauber salt, for example, when the crystallization products are centrifuged, if this method has been used to separate the crystals from the mother liquor before returning the latter back to the cycle. An almost perfect equilibrium may be established in the process between the reduction in quantity of the liquors by crystallization of Glauber salts and the water required for washing purposes, there being, therefore, no excess of liquors and no consequent waste due to this source. In practice in cooling the liquors for the production of Glauber salt, it is found to be the best and safest practice to maintain this equilibrium rather than to strive for the largest yield.

While the specific ratio of $B_2O_3:Na_2O$ has been given above as 12:1 and 16:1 and this specific range of ratios is particularly favorable for holding the iron and aluminum in solution to prevent contamination of the Glauber salt, other ratios are usable in the process. The ratio should preferably be higher than 2:1 and in general may be stated to be within the limits of 3:1 to 20:1.

Furthermore, while sodium carbonate has been mentioned as a particularly desirable alkali metal compound to be used, other sodium carbonates such as the bicarbonate or Trona (sesqui-carbonate) may be used as well as other compounds, such as borax, mono-borate and other borates, particularly of the alkali metals, caustic soda, etc. or mixtures thereof.

While the process has been specifically emphasized in connection with the recovery of sodium sulphate from these solutions, the mother liquors remaining after removal of sodium sulphate are desirably utilized for the recovery of boric acid, so that the process becomes cyclic. For example, additional borate may be added, together with sulphuric acid to decompose it, with subsequent separation of boric acid, the mother liquor from which being treated with a sodium carbonate and cooled to crystallize sodium sulphate. Since substantial amounts of water are removed from the liquors as water of crystallization of the sodium sulphate separated, it follows that the per cent $B_2O_3$ in the mother liquor from the sodium sulphate separation is materially increased. By addition of proper amounts of sulphuric acid an appreciable part of this boric acid can be crystallized and removed. However, additional quantities of borates may be added, if desired, prior to the recovery of boric acid from such mother liquors. Thus the cyclic nature of this process lends itself to the successive recovery of boric acid and sodium sulphate, which recovery may be carried to any point consistent with economy.

In adding borates to the mother liquors from the recovery of sodium sulphate in order to utilize such solutions in the further recovery of boric acid any desired borates may be used such as anhydrous sodium tetraborate, sodium tetraborate decahydrate, pentahydrate, rasorite and any other natural or synthetic alkali metal borate.

While the invention is more particularly concerned with the recovery of sodium sulphate and boric acid from solutions obtained by liberating boric acid from alkali borates by means of sulphuric acid, when desired other acids may be used for liberating the boric acid when recovery of sodium sulphate is not a desideratum.

Further, the washings which as stated above are obtained by washing boric acid recovered from these solutions, and which washings are desirably returned to the process to replace water lost during crystallization of sodium sulphate particularly as the decahydrate, such washings may be returned to the process at any desired point thereof especially when a cyclic process is utilized for recovering boric acid as well as sodium sulphate. And further, such washings may be used to dissolve any of the materials referred to above which may be desirably added to the solutions undergoing treatment, the washings thus serving as a vehicle for carrying into the process the materials desirably added at any given point.

The use of the term "ratio" in the specification and claims is intended to cover a molecular ratio, for example, the number of molecules of $B_2O_3$ compared with the number of molecules of $Na_2O$ of an alkaline nature. That is, the $Na_2O$ present must be limited for this purpose to those combinations in which it is present and affects the alkalinity of the liquor. Any $Na_2O$ present in such combinations as sodium sulphate is consequently excluded from these ratios and calculations based on them.

Having thus set forth my invention, I claim:

1. In the recovery of sodium sulphate from solutions containing the same together with boric acid and contaminating iron and aluminum compounds, the step of adding a sodium carbonate to the solution to establish a ratio of $B_2O_3$ to $Na_2O$ of from 12:1 to 16:1 and partially crystallizing out sodium sulphate from the solution thereby preventing deposition of iron and aluminum compounds with the sodium sulphate.

2. In a process of recovering sodium sulphate and boric acid from solutions containing the same together with contaminating amounts of iron and aluminum compounds, the steps comprising adding sodium carbonate to the solution to produce the ratio of $B_2O_3$ to $Na_2O$ to between 12:1 and 16:1, partially crystallizing out and separating sodium sulphate from the solution thereby avoiding deposition of iron and aluminum compounds, adding a sodium borate to the solution, treating such solution with sulphuric acid to produce boric acid and crystallizing boric acid from the solution.

3. In the recovery of sodium sulphate from solutions containing the same together with boric acid and contaminating amounts of iron and aluminum, the steps which include adding an alkali carbonate to the solution to react with the boric acid to produce a ratio of $B_2O_3$ to $Na_2O$ of between 3:1 and 20:1 and release a quantity of carbon dioxide in the solution, and crystallizing sodium sulphate from said solution in the presence of released carbon dioxide, whereby undesirable precipitation of iron and aluminum compounds is prevented.

KARL J. JACOBI.